United States Patent

[11] 3,611,080

[72] Inventors Gordon William Herzog;
Peter Duncan Fox-Thomas, both of Peterborough, Ontario, Canada
[21] Appl. No. 859,328
[22] Filed Sept. 19, 1969
[45] Patented Oct. 5, 1971
[73] Assignee Canadian General Electric Company Limited
Toronto, Ontario, Canada

[54] COMMON LOAD SHARING BY TWO OR MORE SYNCHRONOUS MOTORS
7 Claims, 5 Drawing Figs.
[52] U.S. Cl. .................................................. 318/99,
318/191, 310/165
[51] Int. Cl. ....................................................... Ho2p 5/50
[50] Field of Search........................................... 318/165,
98, 99, 100, 191; 310/162, 165

[56] References Cited
UNITED STATES PATENTS
3,333,173  7/1967  Durrwachter.................  318/99 X

*Primary Examiner*—Oris L. Rader
*Assistant Examiner*—Robert J. Hickey
*Attorneys*—James T. Comfort, James C. Davis, Jr., Frank L. Neuhauser, Oscar B. Waddell and Joseph B. Forman

ABSTRACT: A drive comprises at least two synchronous motors coupled for driving a load. Each of the motors has an armature winding for producing a rotating magnetic field when energized with alternating current, and a main field winding for producing a multipolar steady state magnetic field when energized with direct current. At least one of the motors also has an auxiliary field winding displaced with respect to the main winding. When energized with direct current the auxiliary winding produces a second multipolar steady state magnetic field having its polar axes displaced with respect to the polar axes of the main field. In one embodiment of the invention, axial slots centrally disposed within the pole piece heads serve to retain one side of two adjacent auxiliary field coils having a span of approximately one pole pitch while in a second embodiment of the invention, one side of the auxiliary field coils extend through a plurality of axial slots in the pole piece head with the other side of the coil being situated between the head and the main field coil disposed about the body of the pole piece. Load sharing is accomplished by varying the relative values of the direct current applied to said main and auxiliary windings of the one motor.

INVENTOR.
GORDON W. HERZOG
PETER D. FOX-THOMAS

THEIR ATTORNEY

COMMON LOAD SHARING BY TWO OR MORE SYNCHRONOUS MOTORS

This invention relates to a way of making two or more synchronous motors share a common load.

Synchronous motors are used extensively in industry to drive constant speed loads. Some of these loads are now becoming so large, e.g. over 5000 hp., that it is no longer practical to drive the load with a single motor. An example is a large ore grinding mill gear driven by two motors. When coupling two or more synchronous motors to a common load, it is necessary to do so in such a way that the motors share the load between them; otherwise one motor may be overloaded while the other is underloaded. Coupling two synchronous motors to a single load so that they share the load has been proposed in a number of ways, some of which are outlined briefly below:

a. At least one of the motors is coupled to the load through a clutch so that on disengaging the clutch the angular position of the rotor of the motor can be altered relative to its coupling with the load, thereby increasing or decreasing the share of the load taken by the motor according to the direction and extent of the adjustment.

b. The motors are coupled to the load by means of accurately formed gears set for proper sharing of the load between the motors.

c. The motors are connected to the load by means of hydraulic or electromagnetic couplings which can be controlled for load sharing.

d. The rotor of at least one of the motors is adjustable with respect to its coupling with the load, or the stator of at least one of the motors is mounted so that it can be rotated a little on the axis of the rotor. These advance or retard the magnetic DC field in relation to the rotating AC field so that the motor is forced to take on or drop off load according to the adjustment.

These methods of sharing a load between two synchronous motors have met with a degree of success, but all have inherent disadvantages. For example, (a) and (d) tend to be difficult to adjust; (b) is difficult to manufacture to the degree of accuracy necessary for proper load sharing and not easily adjusted after the gears have become worn; (c) is capable of good load sharing control, but is expensive and involves another complete machine to be maintained. Since these methods are practically all mechanical in nature, the difficulties in carrying them out will be readily appreciated when one considers individual motor rating in the order of 3000 to 5000 hp.

In a preferred drive according to the invention two synchronous motors are directly coupled to drive a single load so as to share it between them. Each motor has a primary winding, i.e. armature winding, which when energized with polyphase alternating current produces a synchronously rotating magnetic field and a main field winding which when energized with direct current produces a steady state magnetic field that interacts with the rotating field so as to cause the rotor to rotate in synchronism with the rotating field. At least one of the motors has an auxiliary field winding located on the same magnetic core structure as the main field winding and displaced angularly with respect thereto. This winding is also energized with direct current and when so energized it produces a second steady state magnetic field having polar axes spaced angularly from the polar axes of the main field. These fields combine to produce a resultant greater than either one and situated on polar axes in-between the first two sets of axes. The resultant field governs the point at which the rotor locks in step with the rotating field. To change this point, it is only necessary to change the direct current flowing in either one or both DC windings so that the polar axes of the resultant flux shifts angularly. In one embodiment of the invention, one side of adjacent auxiliary field coils having a span of approximately one pole pitch are situated within axial slots centrally disposed in the pole piece heads while in a second embodiment of the invention, the auxiliary field coils extend through a plurality of axial slots in the pole piece head with the other side of the coils being situated between the pole piece head and the main field coil disposed about the body of the pole piece. By sensing the load on the motor and using the signal obtained as a guide, it is now possible to set the relative values of the direct currents in the main and auxiliary windings so that the motor takes a specified proportion of the total load. Although a two motor drive is the one that will be preferred for most applications where a single motor is insufficient, those skilled in the art will readily appreciate that this invention can be applied for load sharing between more than two motors coupled to drive a single load.

Specific ways of carrying out the invention in connection with a two motor drive will now be described in greater detail with reference to the accompanying drawings, in which FIG. 1 is a diagram illustrating two synchronous motors driving a common load;

Figure 1:
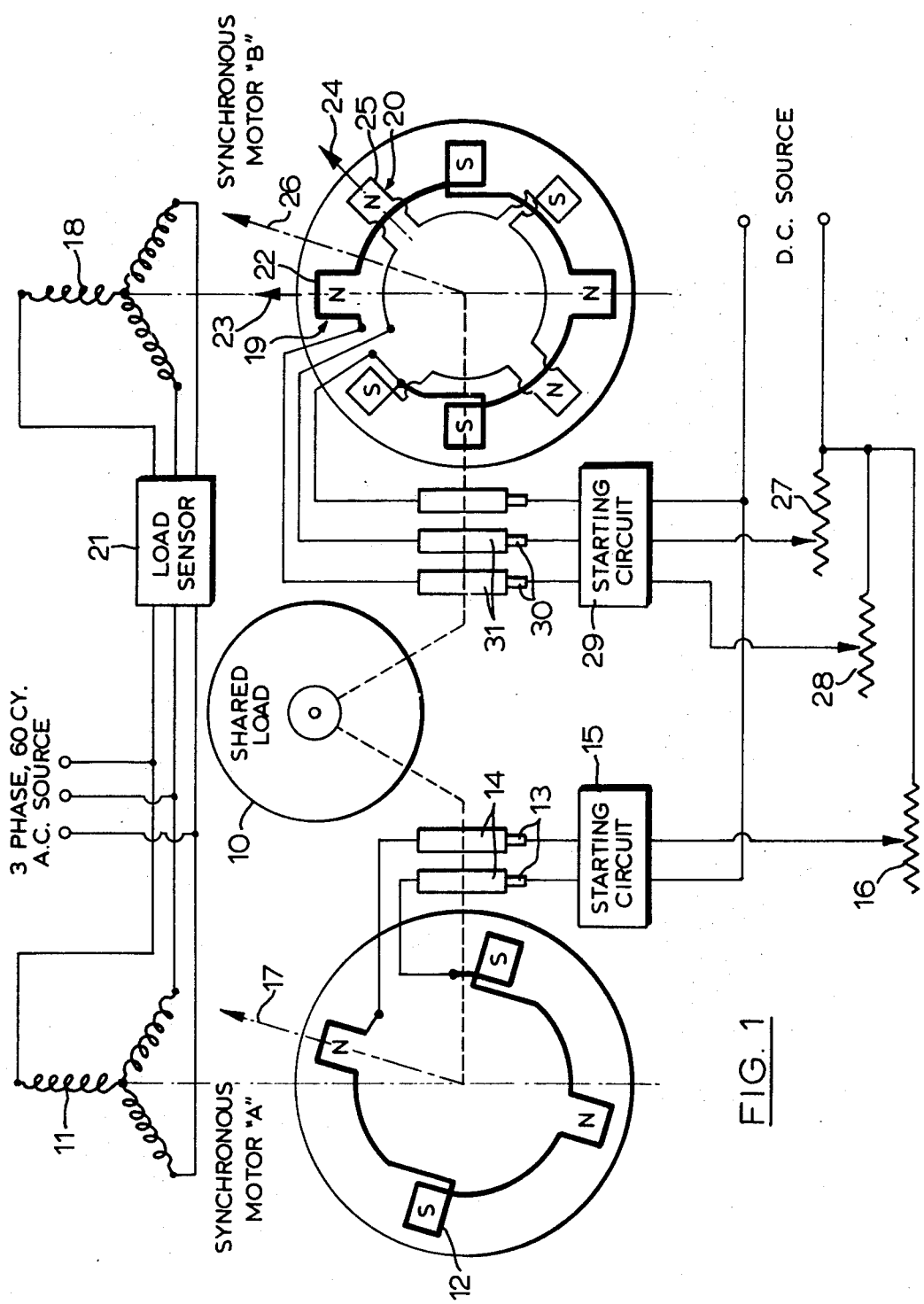

FIG. 1 illustrates diagrammatically two synchronous motors A and B coupled directly to a single load 10 so that both motors drive the load and share it between them according to the respective horsepower ratings of the motors. An example of such a drive is a large ore grinding mill driven by two synchronous motors, each of which has a pinion on its drive shaft meshing with a cogwheel on the mill drive shaft. Preferably, the two motors will have the same ratings, speeds and operating characteristics, or as nearly so as they can be made. Different speed motors can, of course, be used with suitable gearing, but this tends to complicate the installation and will probably be little used.

Motor A is a conventional salient four pole synchronous motor which has a three-phase AC armature winding 11 on its stator and a DC field winding 12 on its rotor. Winding 11 is connected to a three-phase, 60 cycle, AC source, and when energized therefrom it produces a magnetic field which rotates at 60 cycle synchronous speed, in this case at 1800 r.p.m. The four pole field winding 12 is energized from a DC source by way of a pair of stationary brushes 13 in rubbing contact with a pair of slip rings 14 which rotate with the rotor. As is customary with synchronous motors, the field circuit will include some means to insert a resistor across its winding during starting, and remove the resistor and connect the winding to the DC source once the rotor attains its pull-in speed, after which the motor operated at synchronous speed because the steady state magnetic field of the rotor is now locked in step with the rotating magnetic field of the armature. Such means is depicted by the box 15 labeled "starting circuit." Some means will be employed for adjusting the field current, as for example, a rheostat 16 in the field circuit. Although not shown in FIG. 1, the rotor will also include an amortisseur winding of a known type.

Motor B is shown as a salient four pole synchronous motor which has a three-phase AC armature winding 18 on its stator and two DC field windings 19 and 20 on its rotor, of which winding 19 is the main field winding corresponding with winding 12 and winding 20 is an auxiliary field winding displaced angularly with respect to the main field winding. The purpose and function of auxiliary winding 20 will be described later. Winding 18 is connected to a three-phase, 60 cycle, AC source, and when energized therefrom it produces a magnetic field which rotates at 60 cycle synchronous speed, as in the case of motor A at 1800 r.p.m. The power that motor B draws from the AC source is measured by means of a load sensor 21 connected in the line to winding 18. Sensor 21 may be a wattmeter, ammeter or some similar device which senses the power input to the motor and therefore its output loading, or the share of load 10 taken by the motor.

The main field structure of motor B consists of a winding 19 having four field coils on four pole bodies which are spaced around the rotor core at 90° intervals. This is like the field structure of motor A. When energized with direct current, this winding produces a steady state magnetic field having the magnetic axes of the alternate north and south poles at 90° in space or 180 electrical degrees. Arrow 23 represents the direction and magnitude of the magnetic field of the upper north pole 22 and will be referred to hereinafter as its polar axis. When combined fields 23 and 24 give a resultant field 26 located somewhere between poles 22 and 25 and of greater magnitude than either 23 or 24.

For purposes of this discussion, axis 26 of the resultant field represents the point at which the rotor of motor B locks in step with the rotating field from armature winding 18, and polar axis 17 represents the point at which the rotor of motor A locks in step with the rotating field from armature winding 11. Axis 17 is fixed in position relative to the rotor of motor A, but axis 26 is not fixed relative to the rotor of motor B. Axis 26 can be moved relative to the rotor of motor B by adjusting the direct currents flowing in either one or both of windings 19 and 20. Advancing axis 26 in the direction of rotation causes motor B to decrease its share of load 10, and retarding the axis causes the motor to increase its share of the load. The load on motor B can be determined by sensor 21 and if it is not the proper share of load 10, it can be reset to the proper value by changing the auxiliary and/or main field currents, as for example, by a suitable adjustment to rheostats 27 and 28 in the external DC supply for the windings. The external DC source is connected to the windings by way of rheostats 27 and 28, starting circuit 29, the three stationary brushes 30 in rubbing contact with the three slip rings 31 mounted on the rotor shaft for rotation therewith. Circuit 29 performs the same function as circuit 15; it inserts resistors across windings 19 and 20 during motor starting, and once synchronous speed is attained it removes them and connects windings 19 and 20 to the DC source. The rotor of motor B will also include an amortisseur winding of a known type.

Figure 2:
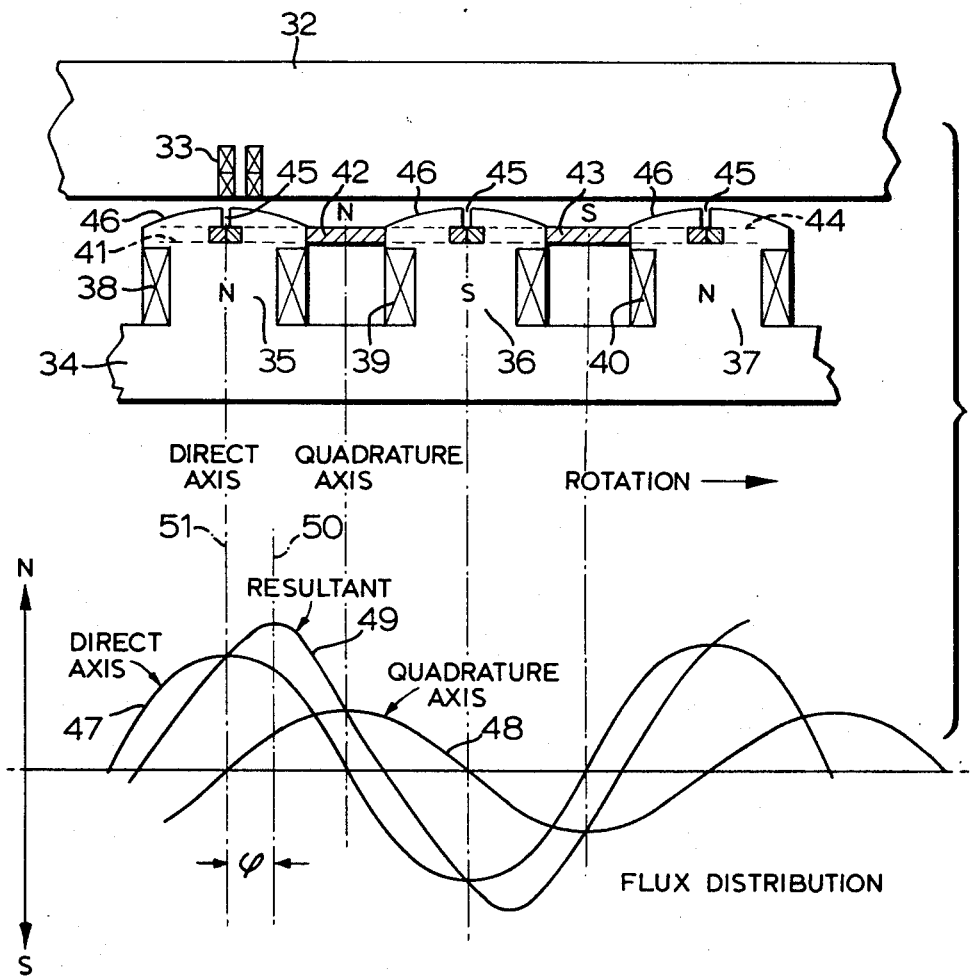
FIG. 2 is a diagram illustrating a field structure and the distribution of the field flux therefrom.

FIG. 1 shows one motor A which cannot be adjusted for load sharing and another motor B which can be adjusted. This is the simplest arrangement of the novel concept. The invention also contemplates an arrangement where both motors are like motor B, that is, both have fields that can be adjusted for load sharing purposes, and installations of more than two motors with field control for load sharing. FIG. 2 illustrates a field coil arrangement and the field flux resulting therefrom. In this figure numeral 32 designates the armature core of a synchronous motor and 33 its AC winding. In the field structure, numeral 34 designates the magnetic core; 35, 36 and 37 three adjacent pole bodies on the core; 38, 39 and 40 the main field coils on pole bodies 35, 36 and 37 respectively; and 41 and 44 the auxiliary field coils carried by pole bodies 35, 36 and 37 respectively. Each one of the auxiliary coils spans almost one pole pitch, extending from approximately the center line of one to the center line of the other. Each pole body contains an axial slot 45 midway of and set in from its face 46, and each slot contains one side of two adjacent coils. The number of turns and the size of the conductor used in the auxiliary coil will depend on machine design and the degree of flux shifting wanted.

Referring again to FIG. 2, curves 47 and 48 represent the distribution of steady state magnetic flux produced by the main and auxiliary fields respectively, and for purposes of this discussion are assumed to be sine waves. Curve 49 is the vector sum or resultant of the two and it too is assumed to be a sine wave. This resultant is the flux that determines the point at which the rotor locks in step with the synchronously rotating armature field, a point which may be represented by axis 50. It will be noted that 100 represents the shift in field flux; therefore, if no auxiliary field were present, the rotor lock in point would be delayed a little to a point represented by the direct axis 51. By a suitable setting of the currents applied to the main and auxiliary field windings, it is now possible to increase or decrease angle 100 as required for proper load sharing between the motors.

Figure 3:
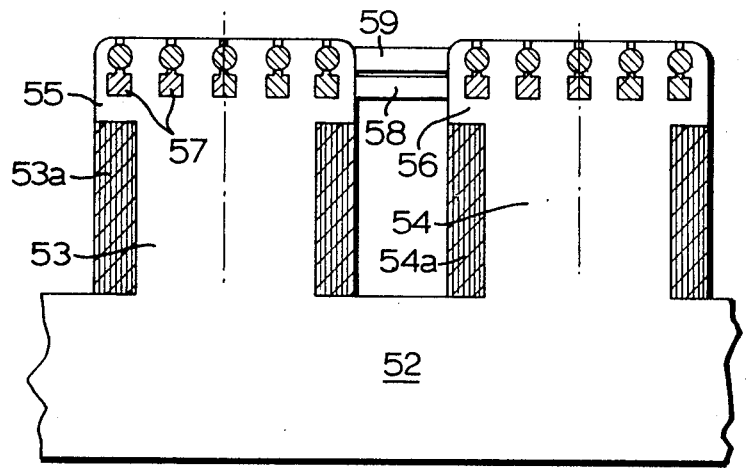
FIGS. 3 and 4 are end and plan views respectively of two poles of a synchronous motor showing the auxiliary and amortisseur windings.
Figure 4:
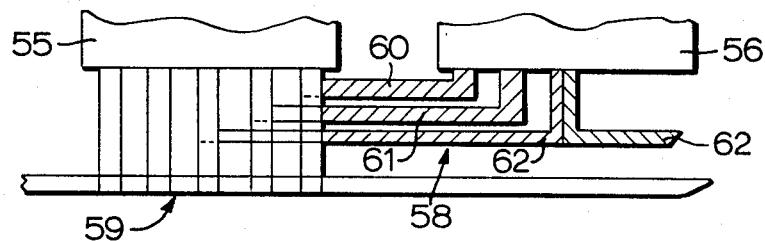

FIGS. 3 and 4 show another arrangement of coils of an auxiliary winding for a salient pole field structure. In these drawings numeral 52 represents the core, 53 and 54 two adjacent pole bodies on the core, 55 and 56 the heads on bodies 53 and 54 respectively, and 53a and 54a the main field coils on bodies 53 and 54 respectively. Each head is formed with a number of axial slots 57 spaced along the pole face. They contain the coils of an auxiliary winding 58 in the bottoms of the slots and the bars of a cage-type amortisseur winding 59 in the tops of the slots. Instead of having an auxiliary winding consisting of a single coil for each pole as in FIG. 2, the winding now consists of three separate coils 60, 61 and 62 per pole placed concentrically in the slots of two against pole heads as illustrated in FIG. 4. This winding also produces an auxiliary flux having its polar axes in quadrature with the polar axes of the main flux as illustrated in FIG. 2.

Figure 5:
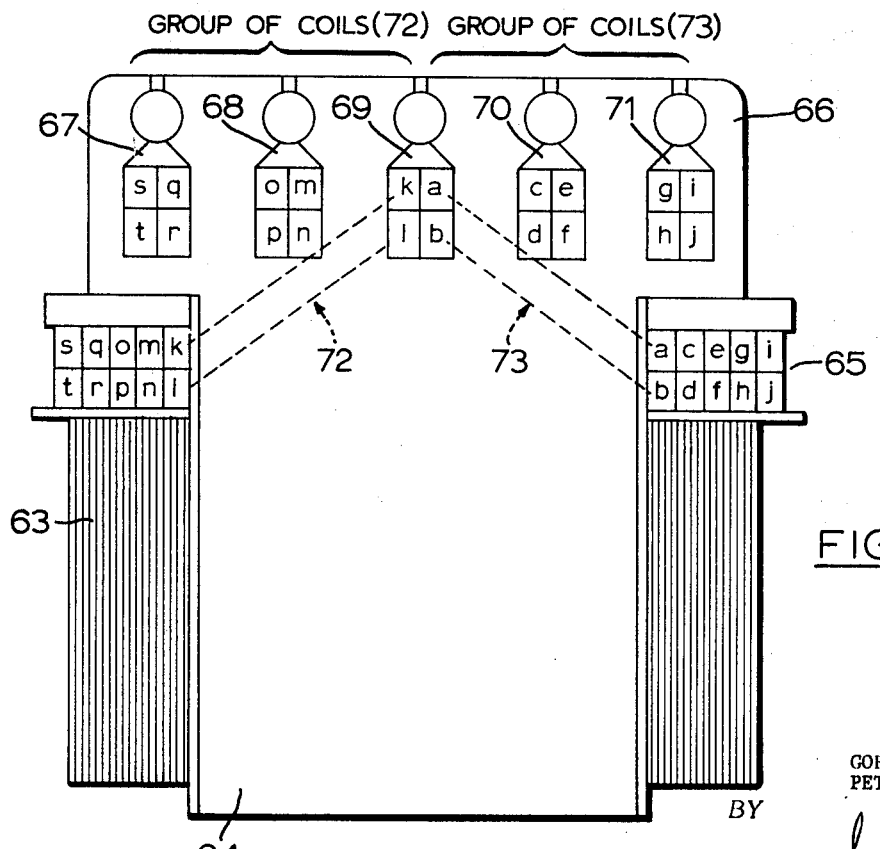
FIG. 5 illustrates another arrangement of main and auxiliary winding coils.

FIG. 5 illustrates a way of placing the coils of the auxiliary winding on each pole structure so that no part of a coil extends from one pole to another. In this figure the main field coil 63 is made a little shorter than pole body 64 and set in radially so as to leave a space 65 between its outer end and the overhanging portion of pole head 66. The pole head is formed with a number of axially disposed slots 67 and 71 extending radially inward from its face in spaced relation. The bottom portions of these slots contain one side of coils "a" to "t" of coil groups 72 and 73 and the top portions conductors of a squirrel cage amortisseur winding. Group of coils 72 has coil sides "k" to "t" located in slots 69, 68 and 67 respectively, and in the left-hand space 65 between the overhang of the pole head and the main field coil, and group 73 has its coil sides "a" to "j" located in slots 69, 70 and 71 respectively and in the right-hand space 65 between the overhang of the pole head and the main field coil. The two groups of coils 72 and 73 per field pole are connected so that when energized with direct current they have opposite polarity. As a result, the magnetic flux from one has the same polarity as the main flux and the other the opposite polarity. This shifts the resultant flux as illustrated in FIGS. 1 and 2 according to the excitation currents flowing in the main and excitation windings.

In all the drawing figures, the auxiliary winding is shown in quadrature with the main winding, that is, the axes of the coils of the auxiliary winding are located 90 electrical degrees with respect to the axes of the adjacent coils of the main winding. This arrangement is preferred because it minimizes any undesirable effects caused by the auxiliary winding; for example, it keeps its time constant to a minimum. Main and auxiliary windings other than quadrature arrangements also come within the scope of this invention.

I claim:

1. A synchronous motor for sharing a common load comprising stator and rotor magnetic cores, an armature winding disposed on one of said cores for producing a rotating magnetic field when energized with alternating current, a main field winding consisting of a number of main field coils disposed on the bodies of pole pieces on the other of said cores for producing a multipolar steady state magnetic field when energized with direct current, said multipolar field interacting with the alternating current generated magnetic field to rotate said motor, and an auxiliary field winding characterized by a number of auxiliary field coils electrically displaced with respect to said main coils to produce a second multipolar steady state magnetic field having polar axes located between the polar axes of said main field, said auxiliary field winding extending through at least one axial slot in the heads of said pole pieces above the pole bodies to assure a completely solidified pole body adjacent said main field windings, said slot containing one side of two adjacent auxiliary field coils having a span of approximately one pole pitch, a slit within said pole head communicating said one sides of the auxiliary field windings with the airgap between the stator and rotor magnetic cores, and means for varying the relative values of the direct current applied to said main and auxiliary windings of said motor whereby the polar axes of the resultant main and auxiliary windings can be shifted to alter the sharing of load by the motor.

2. The motor of claim 1 wherein said slot retaining said auxiliary field winding is situated at the center of said pole head and said main windings completely fill a zone situated between the overhanging ledge of the pole head and the magnetic core.

3. The motor of claim 1 further including an amortisseur winding situated within axially extending slots disposed within the slit communicating the auxiliary field turns with the motor airgap.

4. The motor of claim 3 wherein said auxiliary field coils are characterized by a rectangular cross section and said amortisseur windings are characterized by a circular cross section.

5. A synchronous motor for sharing a common load comprising stator and rotor magnetic cores, an armature winding disposed on one of said cores for producing a rotating magnetic field when energized with alternating current, a main field winding characterized by a number of main field coils disposed on the bodies of pole pieces on the other of said cores to produce a multipolar steady state magnetic field when energized with direct current, said multipolar field interacting with the alternating current generated magnetic field to rotate said motor, and an auxiliary field winding characterized by a number of auxiliary field coils electrically displaced with respect to said main coils to produce a second multipolar steady state magnetic field having polar axes located between the polar axes of said main field, a plurality of axial slots extending through the heads of said pole pieces above the pole bodies to assure a completely solidified pole body adjacent said main field winding, the turns of said auxiliary field winding extending from said slots in said pole head to a zone situated between an overhanging ledge of the pole head and the main field coil disposed on said pole body, the turns of said auxiliary winding situated in axial slots on different sides of the pole piece centerline extending under the pole head on the corresponding side of the pole piece centerline.

6. The motor of claim 5 further including an amortisseur winding situated within axially extending slots disposed between said auxiliary field turns within said head and the motor airgap.

7. The motor of claim 6 wherein said auxiliary field coils are characterized by a rectangular cross section, said amortisseur windings are characterized by a circular cross section and said turns of said auxiliary winding on different sides of the pole piece are connected for opposite polarity.